J. L. GOODKNIGHT.
GEAR BOX FOR AWNINGS.
APPLICATION FILED SEPT. 25, 1911.
1,044,451.
Patented Nov. 12, 1912.
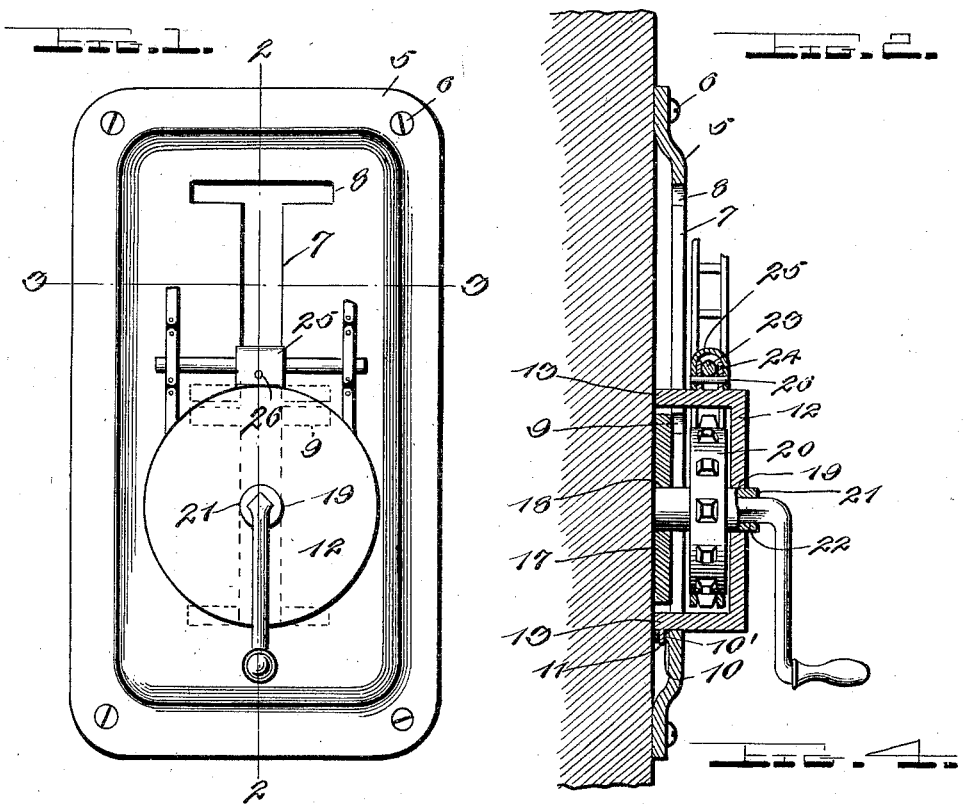
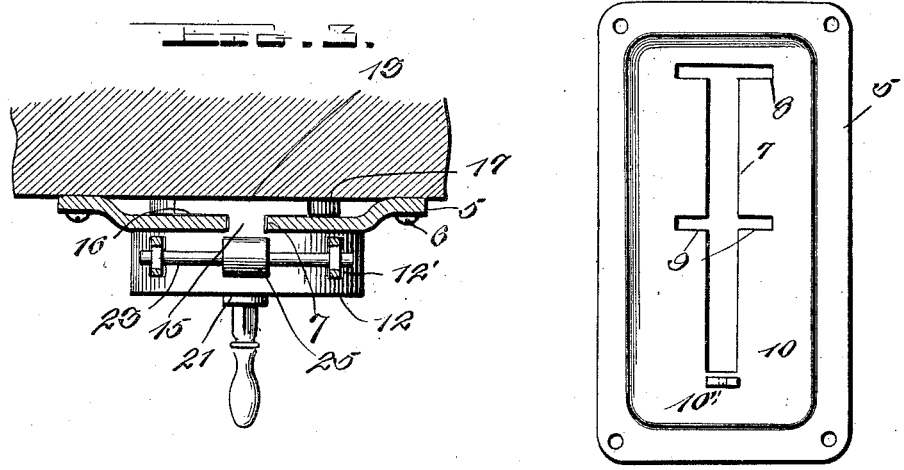
Witnesses
Chas. L. Griesbauer.
A. B. Norton.
Inventor
J. L. Goodknight,
By Watson E. Coleman,
Attorney
COLUMBIA PLANOGRAPH CO., WASHINGTON, D. C.

UNITED STATES PATENT OFFICE.

JAMES LINCOLN GOODKNIGHT, OF LINCOLN, ILLINOIS.

GEAR-BOX FOR AWNINGS.

1,044,451.

Specification of Letters Patent. Patented Nov. 12, 1912.

Application filed September 25, 1911. Serial No. 651,310.

*To all whom it may concern:*

Be it known that I, JAMES L. GOOD-KNIGHT, a citizen of the United States, residing at Lincoln, in the county of Logan and State of Illinois, have invented certain new and useful Improvements in Gear-Boxes for Awnings, of which the following is a specification, reference being had to the accompanying drawings.
This invention relates to improvements in gear boxes or housings for awnings and has for its primary object to provide means whereby the gear box may be easily and quickly attached to or removed from a base or supporting plate fixed to the wall or other permanent support.

Another object of the invention resides in the provision of a device of the above character consisting in its essential features of two elements whereby the gear box or housing may be rigidly mounted and is at the same time susceptible of easy and quick removal from its support.

A further and more specific object of the invention is to provide a base plate for attachment to the wall having a longitudinal slot therein, a gear box provided with oppositely extending projections to extend behind the plate, a supporting lug formed upon said plate at one end of the slot and provided with a bolt receiving opening to receive a stud bolt carried by the box whereby said box is rigidly held in position upon the plate.
With the above and other objects in view, the invention consists of the novel features of construction, combination and arrangement of parts hereinafter fully described and claimed, and illustrated in the accompanying drawings, in which—

Figure 1 is a front elevation of a gear box and mounting therefor embodying the present invention; Fig. 2 is a vertical section thereof taken on the line 2—2 of Fig. 1; Fig. 3 is a transverse section taken on the line 3—3 of Fig. 1; and Fig. 4 is a rear face view of the wall plate.

Referring in detail to the drawing 5 designates a wall or supporting plate which is secured to the face of a wall or other structure by means of a plurality of screws 6. The edge portion of this plate lies closely against the face of the wall while the remaining portion thereof is spaced from the wall. This spaced body portion of the wall plate is provided with a central longitudinally extending slot 7, the upper end of which is laterally extended or widened as indicated at 8. The edges of this slot are also provided with notches or recesses 9 intermediate of its ends and an inwardly extending supporting lug 10 is integrally formed upon the rear face of the plate adjacent to the lower end of said lug. This lug is preferably provided with an opening 11, the purpose of which will be clearly disclosed in the following description.

The gear box or housing indicated at 12 is preferably, though not necessarily, of circular form and is open at one end. The edge of the annular wall of the gear box is adapted to engage closely with the face of the wall plate 5 and upon this annular wall at diametrically opposite points the projections 13 are formed. These projections are provided with reduced lateral extensions 15 whereby recesses 16 are formed between the projections and the edge of the annular wall of the gear box.

Upon the inner face of the wall plate 5 the gear or pinion supporting disk 17 is arranged, said disk having an opening 18 therein which is of substantially equal diameter to the width of the slot 7 in the wall plate. The outer closed end of the box or housing 12 is also provided with an opening 19. The chain operating gear or pinion 20 is arranged within the box 12 and is provided with the reduced cylindrical hubs 21 projecting from opposite faces of said pinion. One of these hub portions of the sprocket pinion is disposed through the slot 7 of the wall plate and mounted in the opening 18 of the disk 17 while the other of said hub portions is rotatably mounted in the central opening 19 of the gear box 12. This latter hub portion of the sprocket pinion is provided with a rectangular socket 22 to receive the similarly shaped end of the crank handle which is adapted to be removably connected to said pinion. The annular wall of the gear box is also provided with openings indicated at 12' for the accommodation of the operating chain. In the assemblage of the parts, the wall plate is securely fastened in position and the lugs or extensions 15 on the upper and lower portions of the annular wall of the gear box are disposed through the extensions 8 of the slot 7 and the recesses 9 which communicate with said slot respectively. The gear box is then moved downwardly, the lugs 15 thereof extending upon the inner face of the wall plate and moving upon the edges of the slot 7 therein. In the lowermost position of the gear box, the stud bolt 11 carried thereby is disposed through the opening in the lug 10 whereby said gear box is supported in position and held against lateral movement with respect to the wall plate upon which the same is mounted. It will of course be understood that the operating chain extends around the sprocket pinion 21 and over a similar pinion arranged upon the end of the awning roller whereby, when the pinion 20 is rotated in the gear box by the application of a suitable crank handle thereto as heretofore explained, the awning may be rapidly wound upon the roller.

In order to prevent reverse movement of the sprocket pinion 21 after the awning has been wound up, I provide a rod 23 the ends of which are adapted to be disposed through the links in the parallel portions of the operating chain, the intermediate portion of said rod being disposed between the spaced ears 24 formed upon the top of the gear box and at the center thereof. These ears are provided with coinciding apertures with which similar apertures in the ends of a U-shaped fastening plate 25 are adapted to register. The intermediate portion of this fastening plate extends over the connecting rod between the parallel portions of the roller chain and through the registering openings in said plate and the ears 24 a pin 26 is adapted to be passed. In this manner, the rod 23 is securely retained in position and the chain held against movement around the sprocket pinion 20.

From the foregoing it is thought that the construction and operation of my improved gear box and mounting will be fully understood. The invention admits of the very quick arrangement of the gear box or housing in position or its removal from the face of the wall or other structure. The disk 17 provides the necessary support for the inner end of the sprocket pinion 20 without interfering with the free vertical sliding movement of the gear box upon the wall plate. As the device consists of very few elements which are all of extremely simple construction, it will be obvious that the invention may be produced at comparatively small cost and that the same is also extremely strong, durable and efficient in practical use.

While I have shown and described the preferred form and arrangement of the various elements, it will be understood that the invention is susceptible of considerable modification without departing from the essential feature or sacrificing any of the advantages thereof.

Having thus described the invention what is claimed is:—

1. The combination with a wall plate, of a gear box slidably and removably mounted upon said wall plate, said plate being provided with an apertured lug projecting from one face thereof, and means carried by the gear box to engage in the aperture of said lug to prevent lateral movement of the box with respect to the plate.

2. The combination with a wall plate having a longitudinal slot therein, of a gear box provided with oppositely extending lugs to engage the rear face of said plate and extend under the edges of said slot, said wall plate being provided with a supporting lug at one end of the slot therein to receive and support said box upon the plate.

3. The combination with a wall plate provided with a longitudinal slot, said slot having spaced laterally extending portions, of a gear box provided with spaced pairs of lugs to be extended through the extensions of said slot and engage the rear face of the wall plate, said lugs being movable upon the edges of said slot, said wall plate being provided upon its inner face with a supporting lug, having an opening, and a stud bolt carried by the gear box to be disposed through said opening and support the box upon the wall plate.

4. The combination with a wall plate having a longitudinal slot, said slot being provided at one end and at its intermediate portion with opposite lateral extensions, of a gear box having oppositely disposed lugs at its top and bottom to be disposed through the extensions of the slot in the wall plate and adapted to engage the rear face of said plate upon opposite edges of the slot, said wall plate being provided with means to limit the downward movement of the gear box and support the same in position on said plate.

5. The combination with a wall plate having a longitudinal slot and provided with supporting means for the gear box at one end of the slot, of a gear box removably mounted in the slot of the wall plate and engaging said supporting means, a disk arranged upon the rear face of said wall plate and provided with a central opening registering with the slot of said plate, and a sprocket pinion rotatably mounted in the opening of said disk and in the outer wall of the gear box.

6. A gear box or housing provided upon its top wall with spaced ears, an operating chain, a rod disposed between said ears and engaged at its ends with the parallel portions of an operating chain, and a fastening plate disposed over said rod and removably connected to said ears to retain the rod in position.

7. The combination with a gear box, a gear therein, and an operating chain to be actuated by said gear, of a rod disposed between the parallel portions of the chain and having its ends engaged with the links thereof, and means to detachably secure said rod at a point intermediate of its ends to the gear box.

8. The combination with a wall plate having a longitudinal slot, of a gear box adjustably mounted in the slot of said plate, said gear box being provided with extensions at opposite points movable in said slot, an operating gear mounted in the box and provided with oppositely extending journals one of which is rotatably mounted in the outer wall of the box, and a disk arranged between the wall plate and the face of the wall and between the extensions of the gear box to receive and support the other journal of the gear.

JAMES LINCOLN GOODKNIGHT.

Witnesses:
D. JELKEN,
FRANK J. PIERCE.

Copies of this patent may be obtained for five cents each, by addressing the "Commissioner of Patents, Washington, D. C."